(12) United States Patent
Soroker et al.

(10) Patent No.: US 6,219,834 B1
(45) Date of Patent: Apr. 17, 2001

(54) EXTENSIBLE COMPILER AND METHOD

(75) Inventors: Danny Soroker, Larchmont; Michael S. Karasick, Pound Ridge; John J. Barton, Mahopac, all of NY (US); David J. Streeter, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/079,982

(22) Filed: May 15, 1998

(51) Int. Cl.[7] ........................................ G06F 9/445
(52) U.S. Cl. .................. 717/6; 717/1; 717/4; 717/5; 717/7; 717/9; 717/11
(58) Field of Search ..................... 395/701, 704, 395/705, 706, 707, 709, 711; 717/6, 4, 9

(56) References Cited

U.S. PATENT DOCUMENTS 5,812,850 * 9/1998 Wimble ................................ 395/704
5,848,274 * 12/1998 Hamby et al. ...................... 395/705

OTHER PUBLICATIONS

Larcheveque et al., "Optimal Incremental Parsing", ACM, pp. 1–15, Jan. 1995.*
Bates et al., "Incremental Program Testing Using Program Dependence Graphs", ACM, 384–396, 1993.*
Soroker et al., "Extension Mechanisms in Montana", IEEE, pp. 119–128, Jun. 1997.*

* cited by examiner

Primary Examiner—Mark Powell
Assistant Examiner—Ted T. Vo
(74) Attorney, Agent, or Firm—F. Chau & Associates, LLP (57) ABSTRACT

An extensible incremental compiler includes an incremental compiler which is configured to pass control to one or more extensions at one or more points in the compilation process. The extensible incremental compiler determines whether an extension is active at various points in the compilation process and, if so, transfers control to the active extension. The extension mechanism performs its programed functionality and then returns control back to the incremental compiler. The extensions are supplied to the incremental compiler via a linked library.

13 Claims, 7 Drawing Sheets

```
40
   [Resource]
   type=extension
   description=Resource Compilation Extension
44  42  help=ResourceExtension.html
     dll=montres.dll
     suffixes=rc RC
46   prefix=res
     options=ResourceCompilerName res_opts

[ResourceCompilerName]
   type=option
   kind=string
   default=irc

[res_opts]
   type=option
   description=Options for the resource compiler
   kind=string
```

FIG. 4

```
52
    target "hello.exe"
56  {
     option define (TRACE, 1),      58
            gen(arch,"pentium"),
50          res_opts("-dFAST")
     {
      source "hello.cpp",       60
             "resource.h",
56           "hello.rc"          60
     }
     option max_nesting_level(20)
54       { tool "NestingChecker"}
     tool "FunctionBodyCounter"
    }
```

```
class FunctionBodyCounter:
        public DependencyNodeCompleteObserver
    {
public:
    FunctionBodyCounter:_fbCount(0) {} virtual void notify(DependencyNode & node,
                        CodeStore & codeStore)
    {
     implementation* i = node->asimplementation();
     if (i && i->asFunctionBody()) ++_fbCount;
    }

~FunctionBodyCounter()
      { cout <<"Number of Function Bodies="
             <<_fbCount<< endl; }
private:
    unsigned _fbCount;
    };
```

```
...
if (observerChain!=NULL) ~90
{
    Observer obs= observerChain; ~92
    for (;obs;obs=obs->next()) ~94
        obs->notify (observer-specific argument list); ~96
}
```

FIG. 9

```
class NestingDiagnostician: public Diagnostician
{
    virtual void diagnoseStatement(Statement& s)
    {
        if (nestingDepth(s)>maxNestingLevel())
            addMessage(error(Severity::Error,
                            s.sourceLocation(),
                            "nested too deeply"));
        if (next())
            next()->diagnoseStatement(s);
    } unsigned nestingDepth(Statement& s)
    {/*calculate depth by subclassing
        Montana's DepthFirstVisitor class*/ } int maxNestingLevel()
    {/*get the maximum allowable value
        from the extension option */ }
};
```

EXTENSIBLE COMPILER AND METHOD

BACKGROUND OF THE INVENTION

1. Field of the Invention

The present invention relates to compilers for computer programing languages, and more particularly relates to a system and method for an extensible incremental compiler and extension mechanisms for same.

2. Description of the Related Art

Compilers are computer programs which translate input programs from a human readable programming language to one or more computer readable files. Compilers are employed in most high level programming languages such as Pascal, Fortran, C and C++. Conventional compilers operate on an entire input file, referred to as source code and generate the computer readable files which are referred to as the object code. This process demands a great deal of computer resources when large files are being compiled.

In order to make the compilation process more efficient, compilers have been developed which determine where changes have been made in the source code and only act upon those sections and any sections of code which depends therefrom. These compilers are known as incremental compilers. For example, techniques for implementing a limited form of incremental compilation have been developed in which a tool called "make" determines which files need to be recompiled based upon time stamps entered after the last compilation process. The "make" tool then directs the compiler to act upon the necessary sections of the source code.

While incremental compilers are known in the art, those compilers which are currently available are constrained to a set of features which are provided by the base compiler. In other words, the compiler and its processes are non-extensible. As a result, either compiler providers are forced to implement a great deal of features which will rarely be used, resulting in undesirable overhead, or compiler users must accept a limited set of features integral to the compiler.

In the past, efforts have been made to provide a compiler with more flexibility. For example, in LISP systems, a metaobject protocol is employed to provide expanded functionality. However, rather than merely augmenting the compilation process, metaobject protocols form the basis for language design by providing a framework for specifying language semantics as well as their associated compiler operations.

Alternatively, a compiler provider can make the source code of the compiler available to end users who wish to add functionality. However, this requires altering and recompiling the underlying compiler each time a new function is required. It also requires freely circulating the source code for the compiler, making it available to would be competitors for copying. In addition, once the compiler source code is modified, subsequent product maintenance by the supplier is virtually impossible.

Accordingly, there remains a need in the art for an incremental language compiler which is extensible to augment the compilation process without altering the well defined, underlying programming language or compiler.

SUMMARY OF THE INVENTION

A method of extensible compilation of a computer program includes the steps of registering a list of available extension mechanisms (extensions); activating those extensions called by the program; passing control from the compiler to an active extension; performing the extension function; and returning control to the compiler.

In accordance with one form of the present invention, an extensible compiler includes an incremental compiler that operates in cooperation with at least one linked library. The linked library includes at least one extension mechanism therein. The extensible compiler receives and operates on a configuration file to provide at least one object file. During compilation, the incremental compiler registers the extensions within the linked library, activates those extensions from the library as specified by the configuration file thereby creating at least one active extension, and passes control to the active extension at an appropriate point during compilation. Upon completing its programmed functionality, the extension returns control to the compiler.

In another embodiment of an extensible incremental compiler of the present invention, the extensions take the form of observer extensions, incorporation extensions, and dependency graph extensions. Observer extensions provide augmented messaging functionality at selected points of interest in the compilation process. Incorporation extensions provide augmented functionality during the process of incorporation by adding or replacing substages in the processing stages of a function body or a variable initializer. Dependency graph extensions allow the dependency graph, which represents the compiled program, to be directly altered by the extension.

Preferably, an extensible incremental compiler formed in accordance with the present invention further includes a graphical user interface and at least one application programming interface (API) for accessing, altering, and generating the extension mechanisms.

These and other objects, features and advantages of the present invention will become apparent from the following detailed description of illustrative embodiments thereof, which is to be read in connection with the accompanying drawings.

BRIEF DESCRIPTION OF THE DRAWINGS

The present invention will be described in detail in the following description of preferred embodiments with reference to the following figures, wherein.

DETAILED DESCRIPTION OF PREFERRED EMBODIMENTS

Figure 1:
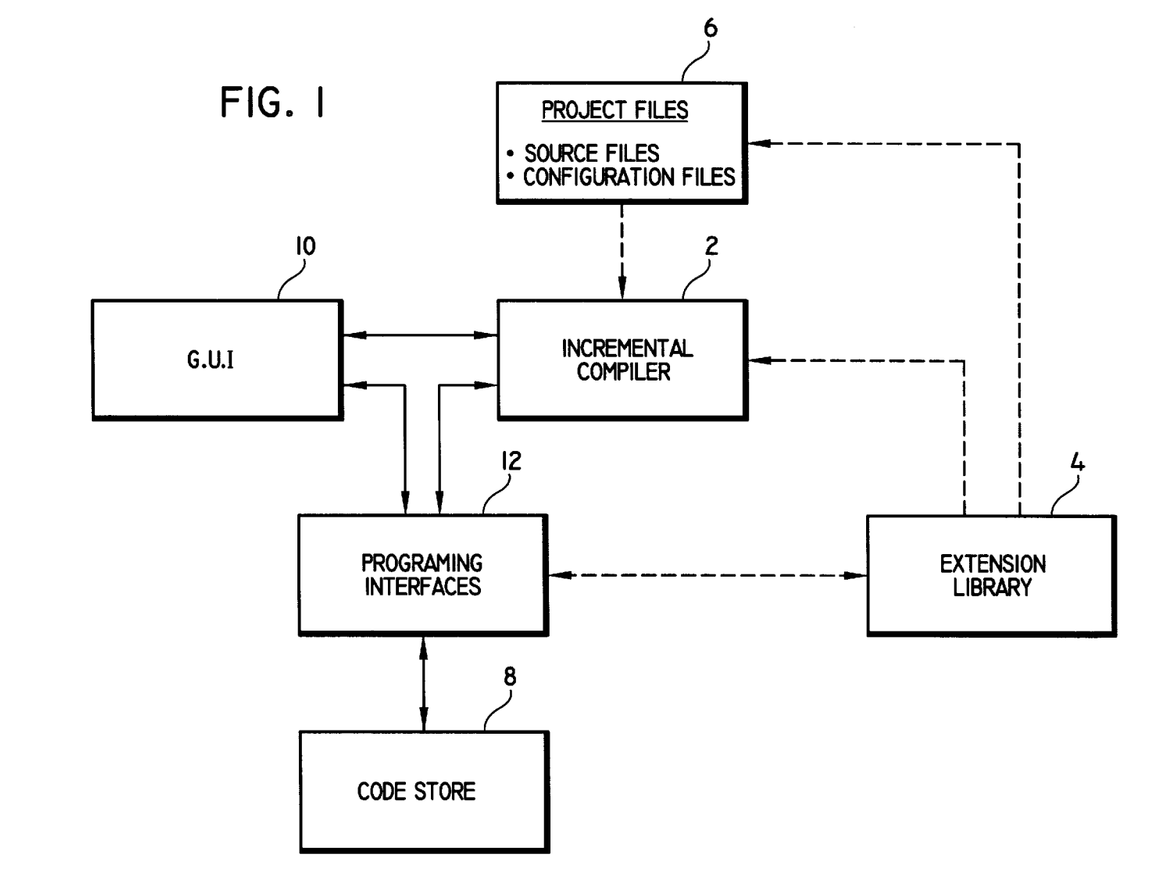
FIG. 1 is a block diagram of an extensible compiler system formed in accordance with the present invention.

An extensible compiler system formed in accordance with present invention is illustrated generally in the block diagram of FIG. 1. The heart of the extensible compiler is an incremental compiler 2 which is operatively coupled to at least one extension library 4. The extension library 4 includes a plurality of extension mechanisms (extensions) which augment the functionality of the incremental compiler 2. The extensible compiler system receives an input program in project files 6 which contain the program source files 38 and at least one configuration file 36. The extensible compiler processes the project files 6 and creates a specialized data structure representing the project files 6 which is referred to as a code store 8. Preferably, the extensible compiler system further includes a graphical user interface 10 and a plurality of application programming interfaces (API) 12 to provide a user friendly compiler environment. While the present invention is applicable to any compiled, high level language, the invention will be described in the context of the C++ compiler environment.

An extension is a self-contained piece of software that embodies a certain behavior. Extensions augment the computation that occurs when the incremental compiler 2 processes an input program which is part of the project files 6. An extension is not an integral part of the incremental compiler 2. Rather, extensions are provided to the incremental compiler 2 through the extension library 4, which preferably takes the form of at least one dynamically linked library (DLL). The extension library 4 is linked to the incremental compilers' executable files during run time.

During operation, the incremental compiler 2 registers those extensions within the extension library 4, activates those extensions specified by the project files 6 and at given points in the compilation process passes control to the active extensions. After receiving control, an extension performs its programmed function and then returns control to the compiler.

Figure 2:
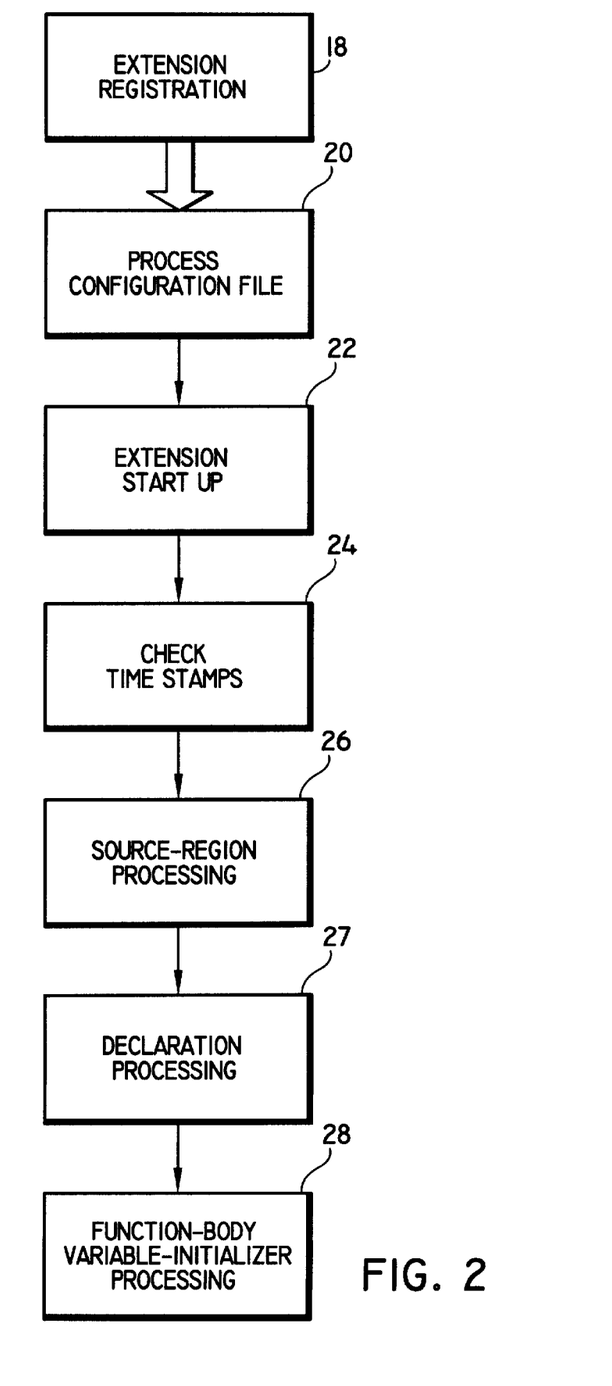
FIG. 2 is flow chart illustrating an incorporation process of an extensible incremental compiler operating in accordance with the present invention.
Figure 3:
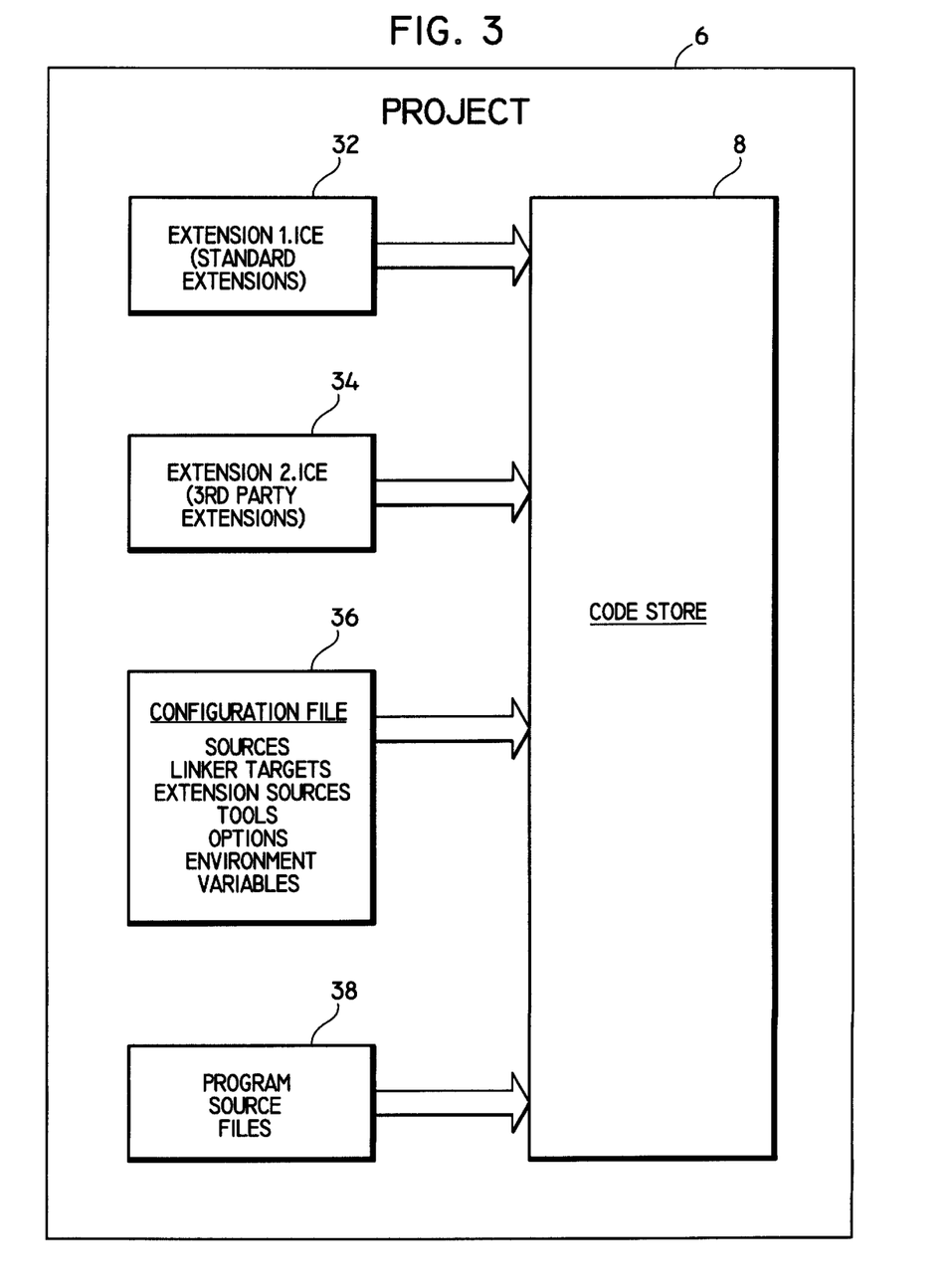
FIG. 3 is a representation of a project definition for an extensible incremental compiler formed in accordance with the present invention.

The incremental compiler 2 performs an incremental compilation process generally referred to as incorporation. An overview of the incorporation process is generally illustrated in FIG. 2. Referring to FIG. 2, the incorporation process begins with a step of extension registration (Step 18). During extension registration, a list of all available extensions contained in the extension library 4 is generated by the compiler 2. The compiler 2 maintains the list of registered extensions in a special data structure known as the code store 8 (FIG. 3).

The extensions are stored in the extension library 4 in one or more special files, referred to as incremental compiler extension files (".ICE files"). Preferably, the extension library 4 includes both standard extensions 32 (i.e., those extensions which are provided by the compiler supplier) as well as third party extensions 34 (i.e., those which can be generated by the end user and third party suppliers), as shown in FIG. 3.

Figure 4:
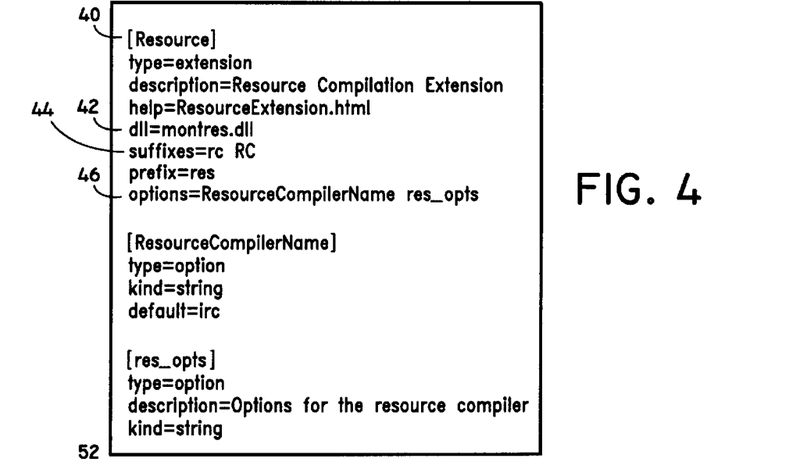
FIG. 4 is a portion of an exemplary compiler extension file, formed in accordance with the present invention.

FIG. 4 illustrates a portion of an exemplary ".ICE" file. An extension is registered by the compiler 2 when a corresponding entry appears in one of the available ICE files 32, 34. This entry contains various pieces of information about the extension, preferably including: a unique name of the extension 40; the name of the associated shared (DLL) library containing the extension 42; a list of file suffixes recognized by the extension 44; and a list of options 46 recognized by the extension. This information is stored by the compiler 2 during registration in the code store 8, for later use. From this information, an extension object is created for each registered extension.

Figure 5:
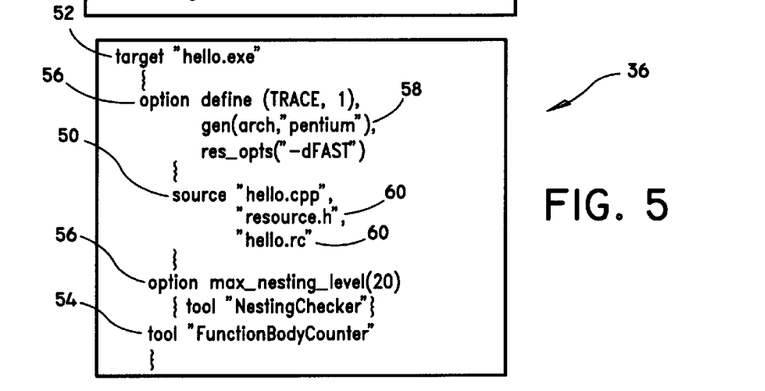
FIG. 5 is a simple, exemplary configuration file, formed in accordance with the present invention.

After the compiler registers all available extensions in the code store 30, the compiler proceeds to process a configuration file 36 (step 20). The configuration file 36, which is part of the project files 6, is the primary file defining the input program to the compiler 2. FIG. 5 illustrates a simple, exemplary configuration file. The configuration file 36 includes such information as included source files for compilation 50, linker target information 52, tools which are invoked during compilation 54, options that are employed 56 and environmental variable assignments 58. The configuration file 36 also provides information regarding those extensions which will be activated 60. Preferably, the extension information is contained in a "file name. suffix" format where the suffix is associated with a particular extension.

When the compiler encounters a file suffix which does not correspond to a C++ file, the compiler refers to the registration list in the code store 8. If the suffix matches one of the entries in the registration list, the extension and a dispatch function for that extension are added to a special data structure referred to as an extension load point structure. The dispatch function is a function pointer that directs the compiler 2 to the appropriate extension library 4 containing the associated extension during operation.

Returning to FIG. 2, after the configuration file 36 is processed and the extension load point structure is created, the compiler initiates the startup method associated with each active extension (step 22). The startup methods are responsible for adding the extensions to appropriate linked lists for later execution.

After the startup method of active extensions has been run, the compiler then checks a time stamp associated with each of the source code files (step 24). Because of the incremental nature of the compiler, the incorporation process only acts on those sections of the source code which have been altered since a previous incorporation pass. Therefore, the incorporation process does not reprocess source files whose time stamp has not changed.

Assuming that the source code currently being processed has a time stamp which is not equal to that of the previous compilation, the compiler advances to a source-region processing operation (step 26). In order to facilitate the incremental nature of the compiler, the source code is broken down into regions for evaluation. Generally, the regions are defined by blocks of source code which are integrally related, such as sub routines, global declarations, and the like. Once the source code is broken down into regions, the regions are evaluated to determine whether any changes have taken place since the last compilation process. The compiler places those regions which have been changed on a processing queue for further incorporation.

After source-region processing, the compiler 2 advances to a declaration processing step 27. During declaration processing 27, the compiler 2 identifies and compiles those variable declarations used in the project files 6.

Once the declaration processing step is complete, the code store 8 must be updated to reflect changes in the project files 6. The compiler represents the compiled source code in the code store 8 in the form of a dependency graph. The dependency graph includes dependency nodes, representing compiler objects, and dependency arcs which show compilation dependencies between nodes. The updating process involves recompiling those regions placed on the processing queue, propagating changes through the dependency graph, deleting stale (changed) nodes and dependency arcs as well as providing new dependency nodes and dependency arcs as required. This process is continued in function-body and variable initializer processing (step 28).

Figure 6:
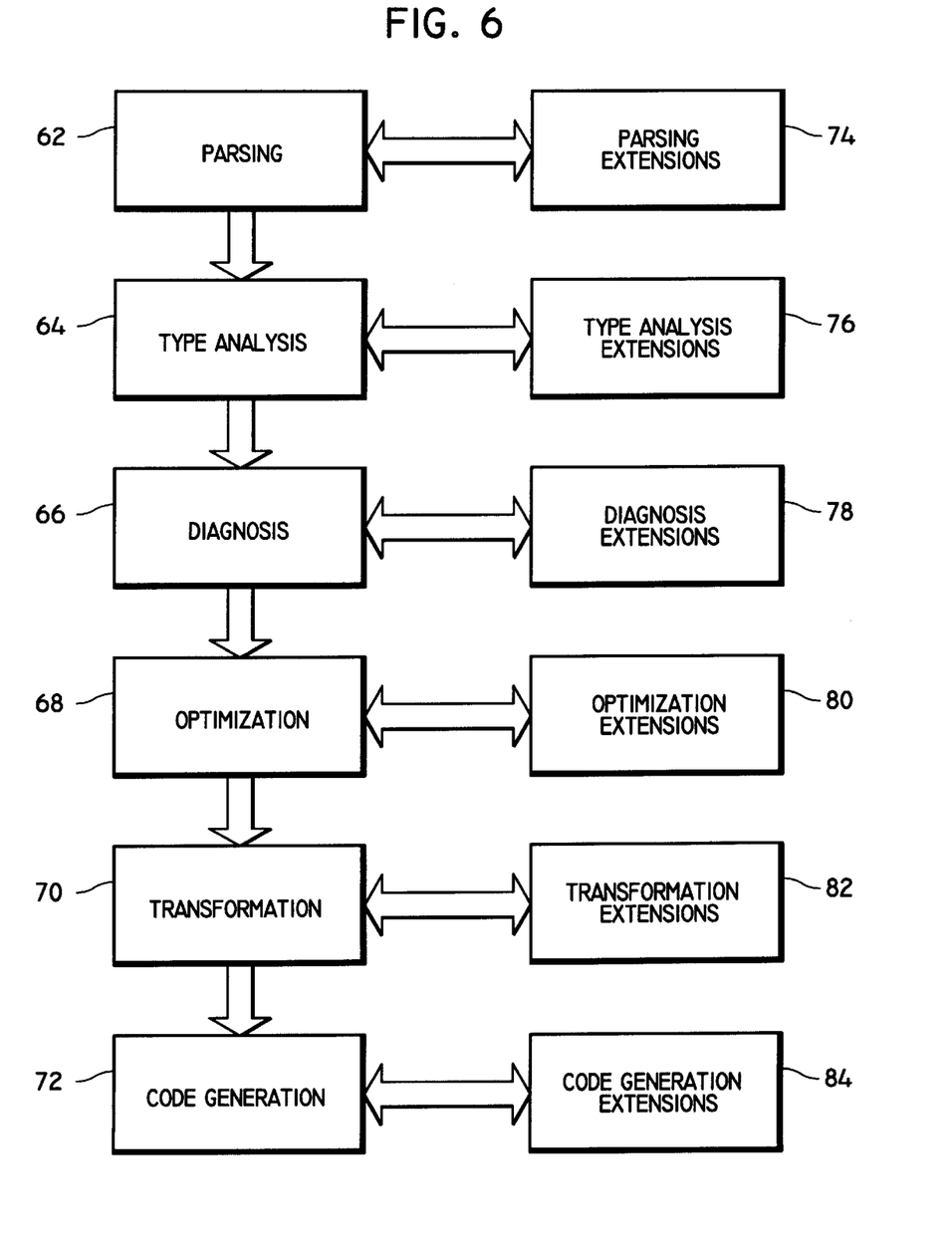
FIG. 6 is a flow chart illustrating function-body and variable initializer processing, extended in accordance with the present invention.

Function-body, variable-initializer processing (step 28) is further illustrated in the flow chart of FIG. 6. This process includes the steps of parsing (step 62); type analysis (step 64); diagnosis (step 66); optimization (step 68); transformation (step 70); and code generation (step 72), which are generally known to those skilled in the art of compiler design. However, each of these sequential processing stages 62–72 is now extensible by operation of appropriate extension mechanisms. For example, upon completing the base parsing operation of step 62, the compiler 2 will pass control to any parsing extensions 74 active in the current project. Similarly, extension mechanisms can be added to the remaining steps of the function-body, variable initializer process as is shown in FIG. 6. Because extensions 74–84 operate to augment the incorporation process, these extensions are generally referred to as incorporation extensions. An extension of a given step may also replace the compiler's base processing of that step.

In addition to incorporation extensions, an extensible incremental compiler formed in accordance with the present invention also employs other families of extensions which will be referred to as observer extensions and dependency graph extensions. The specific operation of each extension type will now be discussed.

Observer Extensions

Throughout the compilation process, events occur which may be of interest to a user. In order to act on these events or alert the end user of such an event, the extensible incremental compiler of the present invention includes observation sites which are associated with the events of interest. Each observation site has an associated linked list of active extensions which are referred to as observer extensions. Observer extensions are keyed to the occurrence of an event associated with an observation site. The observation sites are inherent to the compiler 2, and are placed throughout the compilation process at locations where such events occur.

Figure 7:
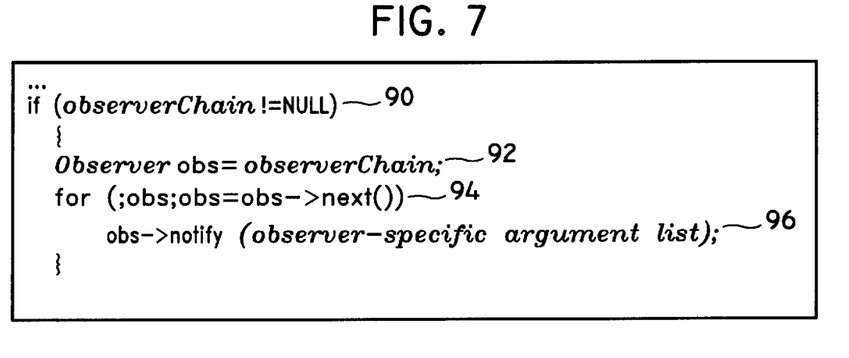
FIG. 7 is an exemplary observer dispatch call formed in accordance with the present invention.

FIG. 7 illustrates an exemplary observer dispatch routine invoked by the compiler 2 upon reaching a designated observation site. Upon reaching the observation site, the compiler reads the associated linked list and determines whether any observer extension is active for that observation site. If the list is empty 90, then no observers are active and the compilation process continues. However, if observers are associated with an observation site 92, the compiler 2 traverses the list of observers 94 and calls each observer extension in turn through an associated notification method 96.

Figure 8:
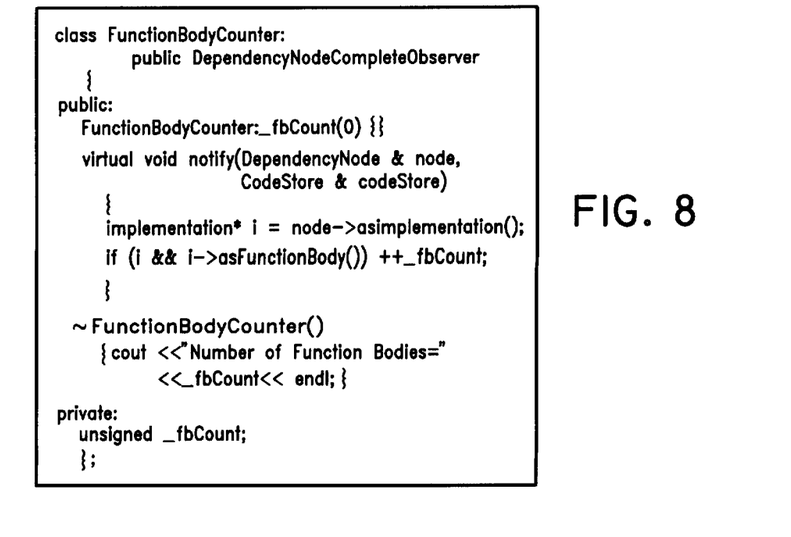
FIG. 8 is a simple, exemplary observer extension formed in accordance with the present invention.

Generally, the observer extensions track events in the compilation process and implement event based messaging. Accordingly, observer extensions are generally passive and do not substantially alter the flow of the compilation process. FIG. 8 illustrates the implementation of a simple observer formed in accordance with the present invention. This exemplary observer counts the number of function-body updates which have occurred in the incorporation process by receiving a notification from the compiler 2 whenever a function-body is updated.

Incorporation Extensions

Extensions associated with the incorporation process are referred to as incorporation extensions. Incorporation extensions are used to augment the manner in which the function-body and variable-initializer processing (step 28, FIG. 2) is performed. Traditionally, the incorporation process generally follows a fixed sequence of stages including parsing 62, type analysis 64, diagnosis 66, optimization 68, transformation 70 and code generation 72 as illustrated in FIG. 6. As these processing stages are well known to those skilled in the art, a detailed description of such operations is omitted from the present disclosure.

In the extensible incremental compiler of the present invention, incorporation extensions provide a vehicle to augment or replace one or more of these incorporation stages. For each of the aforementioned stages, the extensible incremental compiler maintains a corresponding linked list of active extensions which was created by the startup methods for the incorporation extensions (step 22, FIG. 2). At each stage in the incorporation process, the compiler evaluates the corresponding list to determine whether any extensions are active. The compiler then passes control to the incorporation extensions in the list, in sequence. When the list is exhausted, the compiler continues its own integral processing operation. This process can take place at any point within each processing stage. When the extensions are invoked prior to the compilers' associated processing steps, the compiler 2 may be directed by an extension to bypass its own processing for that given stage.

Figure 9:
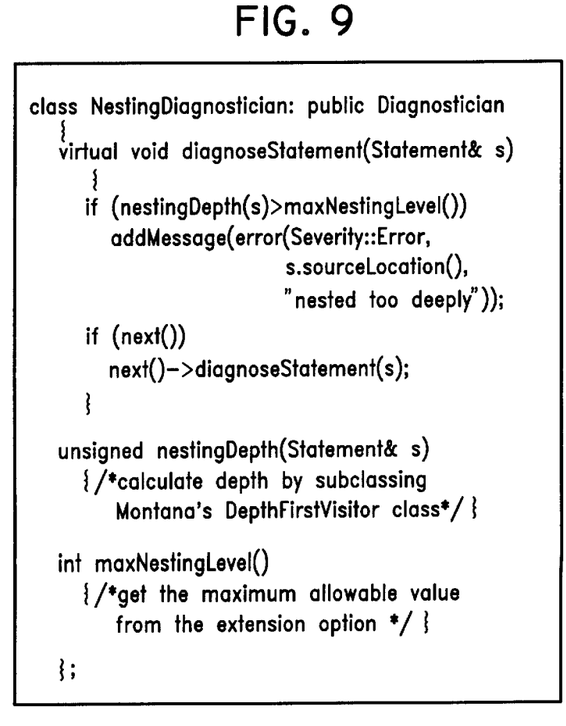
FIG. 9 is an exemplary incorporation extension formed in accordance with the present invention.

FIG. 9 illustrates an exemplary incorporation extension used to augment the diagnosis step 66 of the incorporation process. This exemplary extension provides a tool for checking the depth of nested loops. After the compiler 2 performs its own set of diagnostics (step 66), this extension is called from the linked list associated with the diagnosis step 66 and the diagnosis extension 78 is executed. In this case, the extension generates an error message if a maximum nesting level, specified as an option, is exceeded. After performing this operation, the diagnosis extension 78 returns control to the compiler 2 at the diagnosis stage 66. The compiler then checks the linked list to see if other extensions are active for the diagnosis stage 66. If not, compilation proceeds to the optimization stage 68. Similar operations take place for parsing extensions 74, type analysis extensions 76, optimization extensions 80, transformation extensions 82 and code generation extensions 84.

Dependency Graph Extensions

The third type of extensions available to the compiler 2 are referred to as dependency graph extensions. As mentioned previously, incremental compilers represent the compiled input program in the form of a dependency graph which includes nodes (representing compiler objects) and dependency arcs (which illustrate a relationship between nodes). Dependency graph extensions have the ability to create new dependency nodes and dependency arcs which augment the dependency graph in the code store 30. Rather than being invoked at a specific point during the compilation process, dependency graph extensions select the point in dependency graph processing when they will be activated. In addition, dependency graph extensions can be used to generate new types of dependency nodes, not otherwise available to the base compiler.

Dependency graph extensions provide a powerful tool for augmenting the base compilation process. For example, a dependency graph extension can be provided for processing source files of a language that is not known to the compiler 2 (i.e., non C++ source files). To do this, the dependency graph extension creates a new kind of dependency node which corresponds to a source file of this other language. During a compilation process which incurs after that source file is changed by the user, the new dependency node detects that the time stamp of the source code has changed and invokes an external compiler for this other language, which in turn reprocesses the source code of the other language.

Figure 10A:
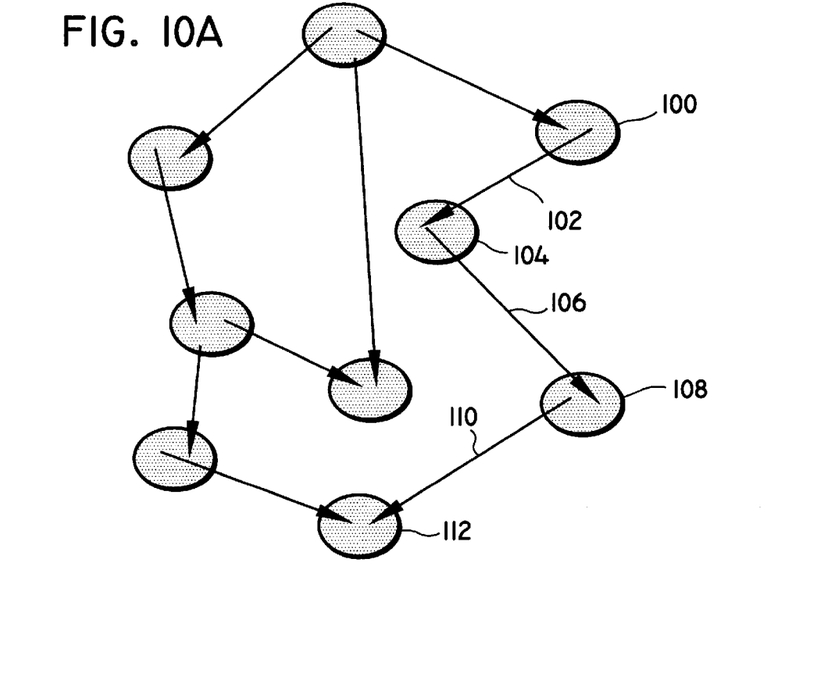
FIGS. 10A and 10B are dependency graphs representing a compiled project, before and after extension, respectively.

FIG. 10A graphically illustrates a simplified dependency graph prior to extension. As illustrated in FIG. 10A, the dependency graph includes a plurality of nodes and a plurality of dependency arcs linking various nodes. The dependency arcs represent compiler dependencies. For example, if during compilation, the incremental compiler detected a change in node 100, this node would be recompiled. In addition node 104 which is linked to node 100 via dependency arc 102 would also be recompiled. Similarly, dependency nodes 108 and 112 would also be recompiled because of the links illustrated by arcs 106 and 110 respectively. The remaining nodes, which were unchanged, need not be recompiled.

Figure 10B:
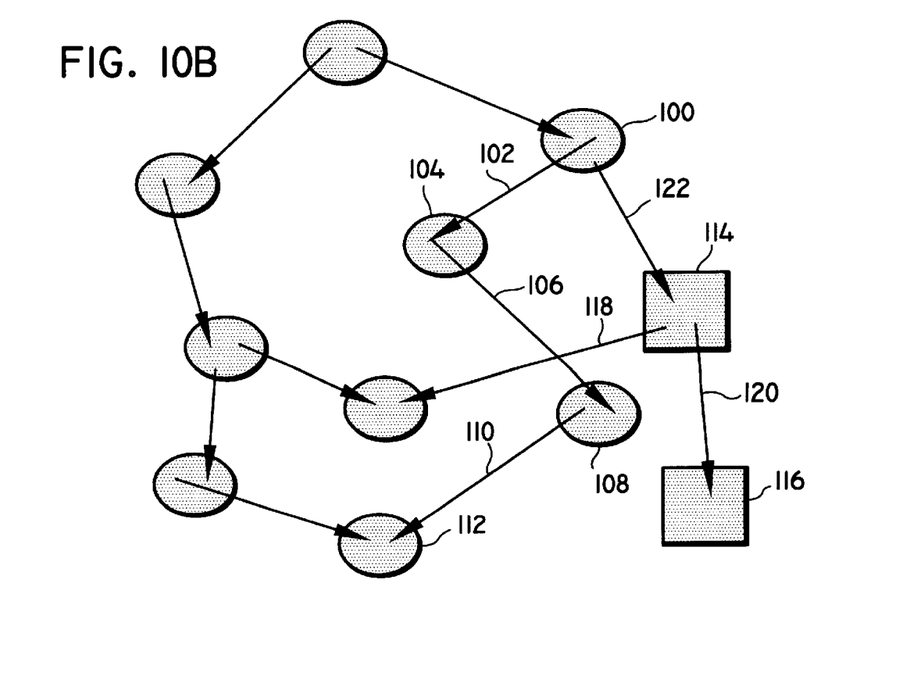

FIG. 10B illustrates the result of a dependency graph extension operation on the dependency graph of FIG. 10A. Referring to FIG. 10B, the dependency graph extension is capable of generating new dependency nodes 114, 116 which are linked into the existing dependency graph through newly created dependency arcs 118, 120, 122. Preferably, the dependency graph extensions can be manipulated by using the graphical user interface 10 (FIG. 1).

An extensible incremental compiler formed in accordance with the present invention provides greater flexibility to the end user. In addition, the use of extension mechanisms accessible through shared libraries provide a vehicle for third party providers to generate useful extensions for end users. The result is a powerful compiler that provides enhanced, selectable functionality to the end user.

Having described embodiments of the present invention, it is noted that modifications and variations can be made by persons skilled in the art in light of the above teachings. It is therefore to be understood that changes may be made in a particular embodiment of the invention disclosed which are within the scope and spirit of the invention as outlined by the appended claims.

What is claimed is:

1. A method of performing extensible compilation by a compiler for a computer program having a configuration file, comprising the steps of: registering a list of available extensions;

activating those extensions called for by the computer program;

processing the configuration file to determine which of said available extensions are active in said computer program;

executing an initialization process for each said active extension;

passing control from the compiler to an activated extension;

processing the activated extension; and returning control to the compiler.

2. The method of performing extensible compilation of a computer program as defined by claim 1, wherein said extensions are provided in at least one shared library, and wherein said step of registering identifies the shared library for each of said available extensions.

3. The method as defined by claim I , wherein said executing step provides an entry in at least one linked list of extensions for each of said active extensions.

4. The method as defined by claim 1, wherein said compiler includes at least one observation site having an associated linked list of active extensions and wherein said step of passing control is effected upon reaching each at least one observation site.

5. The method of performing extensible compilation of a computer program as defined by claim 1, wherein said compiler is an incremental compiler and wherein said step of passing control is effected during an incorporation process.

6. The method as defined by claim 5, wherein during said processing step said activated extension augment at least one of a parsing operation, a type analysis operation, a diagnosis operation, an optimization operation, a transformation operation and a code generation operation.

7. The method of performing extensible compilation of a computer program as defined by claim 1, wherein said compiler is an incremental compiler which generates a dependency graph representing at least a portion of the project, wherein during said operating step said extension alters the dependency graph.

8. The method of performing extensible compilation of a computer program as defined by claim 7, wherein the dependency graph includes dependency nodes and dependency arcs and wherein said altering includes at least one of adding dependency nodes, deleting dependency nodes, adding dependency arcs and deleting dependency arcs.

9. A system for performing incremental compilation of an input project file comprising:

a linked library, said linked library including a plurality of extensions therein; and an incremental compiler, said incremental compiler:

registering each of said extensions within said linked library;

processing the project file to determine which of said extensions are active;

activating at least one of said extension specified by the project file thereby creating at least one active extension;

executing a process for each said active extension; and passing control to said at least one active extension during compilation.

10. An extensible compiler for operation with a linked library including a plurality of extensions therein, the extensible compiler receiving a project file and providing at least one object file, the extensible compiler comprising an incremental compiler, said incremental compiler for registering the extensions within said linked library, processing the project file to determine which of said extensions are active; activating at least one of said extensions specified by the project file, thereby creating at least one active extension, executing a process for each said active extension, and passing control to said at least one active extension during compilation.

11. The extensible compiler as defined by claim 10, wherein the incremental compiler includes at least one observation site, each said observation site having an associated linked list of active extensions, said compiler passing control to said active extensions in said linked list upon reaching said observation site.

12. The extensible compiler as defined by claim 10, wherein the incremental compiler performs at least one stage of function-body processing, each said at least one stage having an associated linked list of active extensions, said compiler passing control to said active extensions in said associated linked list during said associated at least one stage.

13. The extensible compiler as defined by claim 10, wherein the incremental compiler represents at least a portion of the project file in the form of a dependency graph, said incremental compiler passing control to said active extension upon detecting a point in the dependency graph altered by said active extension.

* * * * *